Dec. 27, 1949   C. M. OSTERHELD   2,492,316
ROOM HEATER
Filed Nov. 19, 1946
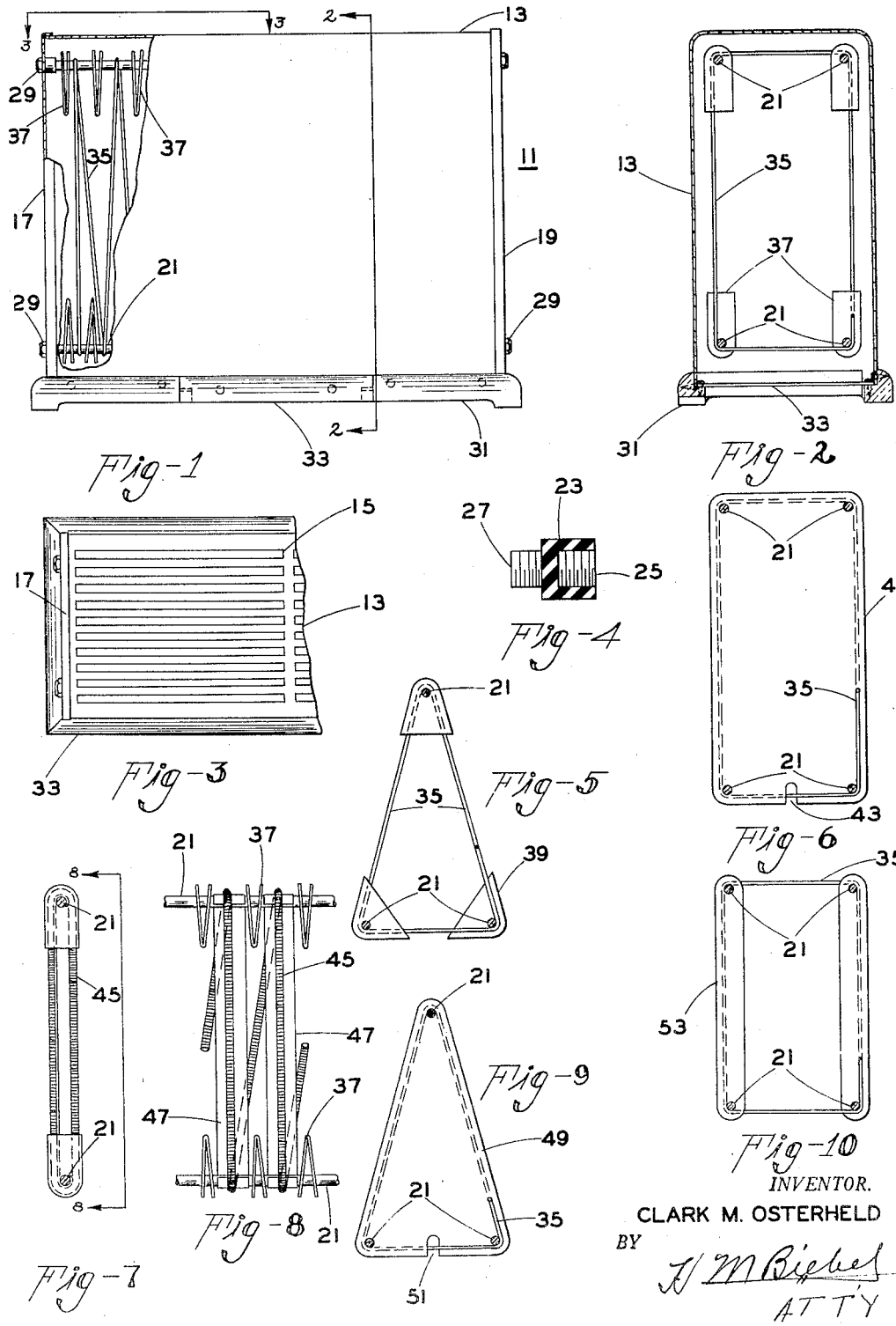
INVENTOR.
CLARK M. OSTERHELD
BY
F. M. Biebel
ATT'Y Patented Dec. 27, 1949

2,492,316

UNITED STATES PATENT OFFICE 2,492,316

ROOM HEATER

Clark M. Osterheld, Stoughton, Wis., assignor to McGraw Electric Company, Elgin, Ill., a corporation of Delaware Application November 19, 1946, Serial No. 710,773

6 Claims. (Cl. 219—38)

My invention relates to electric air heaters.

An object of my invention is to provide a relatively simple structure for a portable electric air heater.

Other objects of my invention will either be apparent from a description of several forms of a device embodying my invention or will be pointed out in the course of such description, and be set forth in the appended claims.

In the drawings,

Figure 1 is a view in front elevation, with a part of the casing broken away, of an electric air heater embodying my invention, Fig. 2 is a view in lateral section therethrough, taken on the line 2—2 of Fig. 1, Fig. 3 is a fragmentary top plan view thereof, Fig. 4 is a view in longitudinal section through an insulating bushing, Fig. 5 is a fragmentary view in side elevation of a modified form of electric heating unit, Fig. 6 is a fragmentary view in side elevation of a modified form of electric heating unit, Fig. 7 is a fragmentary view in side elevation of a still further modification of an electric heating unit.

Fig. 8 is a fragmentary view in front elevation of the parts shown in Fig. 7,

Fig. 9 is a fragmentary view in side elevation of another modification of an electric heating unit, and Fig. 10 is a fragmentary view in side elevation of a still further modification of an electric heating unit for a room heater embodying my invention.

Referring first of all to Figs. 1 to 4 inclusive, I have there shown an electric room heater designated generally in its entirety by the numeral 11. This heater embodies a relatively thin walled casing 13 comprising two side portions as well as a top portion, the top portion being provided with a plurality of slotted perforations 15 therein. My heater includes also two thin walled end closures 17 and 19 which have return-bent side edges overlapping the ends of member 13 to present a pleasing appearance.

My heater includes, in the form shown in Figs. 1 to 4 inclusive, four rods 21 which are preferably made of metal and are of such length that their ends may be screwed into bushings 23, which bushings are made of solid electric-insulating material. Bushings 23 have at one end thereof a recess 25 which is provided with screw threads so that rods 21 may be screwed thereinto. The other end of bushing 23 is provided with a reduced externally threaded end portion 27 which is adapted to extend through either of the end closures 17 or 19 and which may have a holding nut 29 screwed thereon. This will hold the casing structure in proper operative position.

The device embodying my invention includes also a base 31, which is preferably made of a molded material such as Bakelite, and which has a drawer 33 less in length than the length of member 31, which drawer 33 may be filled with water.

The housing 13 and 17 and 19 is preferably metallic and while I may use steel, I prefer to make it of a lightweight thin sheet metal, such as aluminum. The thickness of members 13, 17 and 19 is on the order of .035" and while I have given a definite thickness I do not wish to be limited thereto since I may use thicknesses ranging from .03" to .04".

The diameter of rods 21 may also be any desired value and, as an example, I may use a one-quarter inch or a three-eighths inch rod, and the material may also preferably be aluminum.

On rods 21 I wind in extended helical shape a resistance conductor 35 and place a short metal spacer 37 between each adjacent pair of conductors 35. These small metal sheets may preferably be made of substantially U shape or of V shape and provided with openings adjacent their ends, the openings being slightly larger than the diameter of rod 21 on which they are mounted, the tendency of sheets 37 to spring outwardly or away from each other then holds the sheets 37 in a desired and proper operative position on rod 21.

The entire outer surface of the rods 21 and of the resistor conductor 35 may be covered with an integral, inorganic, heat-conducting, high-temperature-resisting and electric-insulating coating, the thickness of which is on the order of .001". Patent #1,526,127 discloses a method of making such a coating on aluminum. While I have stated that the thickness of such coating is on the order of .001" it may vary from .0005" to .0015".

Referring now to Fig. 5 of the drawings, I have there illustrated a heater in which the resistance conductor 35 is wound on three rods 21, two of these rods being located at the bottom of a suitable casing, while the third rod is positioned at the top of the casing. I provide spacing sheets 39 which may be of substantially the same kind as are the sheets 37 on the rods 21 between the adjacent turns of resistance conductor 35, and which may be substantially triangular in shape.

Referring now to Fig. 6 of the drawings, I have there shown an electric heater embodying four rods 21 substantially the same as in Figs. 1 and 2 of the drawings but I provide spacing sheets 41 which extend over all of the rods 21, as will be noted by reference to Fig. 6 of the drawings. Each sheet 41 is provided with a small recess 43 adjacent the bottom edge thereof so that the conductor 35 may extend therethrough. In all other respects the casing for the heater shown in Fig. 6 is substantially the same as that shown in Figs. 1 to 3 inclusive.

The same comments as were made with regard to the material of rods 21 and of the resistance conductor 35 apply also to the rods 21 and the conductor 35 in Figs. 5 to 6 inclusive.

Referring now to Figs. 7 and 8, I have there shown the use of two rods 21 positioned one adjacent the top and one adjacent the bottom of a casing, on which a helically wound resistance conductor 45 is strung. This will permit of increasing the amount of electric energy translated into heat in my improved electric heater very much over the substantially straight conductor 35.

I provide a plurality of sheets 37 bent to substantially U or V shape as has already been hereinbefore described in connection with Figs. 1 through 4 of the drawings. I provide also relatively thin sheets or strips 47, the end portions of which are bent over and around the rods 21 so that when current is traversing the resistance conductor 45 and this conductor tends to lose its original shape, there will be no tendency for short circuiting between the opposite vertically extending reaches of the conductor 45.

Referring now to Fig. 9 of the drawings, I have there shown a three-rod heater, on the rods of which are mounted triangularly shaped sheets 49 which are strung upon the three rods 21. Each sheet 49 is provided with a small recess 51 adjacent to the bottom portion thereof, through which the conductor 35 may extend.

Referring now to Fig. 10 of the drawings, I have there shown a still further modification of an electric room heater embodying my invention and comprising four rods 21, the upper and lower rod of each being connected by a strip 53 of metal. A conductor 35 is wound around the four rods 21 in substantially the same manner as shown for instance in Fig. 2 of the drawings.

I desire it to be understood that the outer surface of the rods 21 are covered with the anodic coating hereinbefore described, as are also the sheets 37, 39, 41, 47, 49 and 53. The resistance conductor 35 and 45 may also be covered with substantially the same coating, particularly if the material of the resistance conductor is aluminum.

The supporting structure of the various forms of electric room air heaters is of metal, and of metal which is provided with an electric insulating coating according to any one of a number of patents of which the hereinbefore cited patent is merely an example.

The device embodying my invention thus provides a relatively simple mechanical structure comprising metal for the support of a metallic resistance conductor, which resistance conductor may be wound on either two spaced rods, on three spaced rods, or on four spaced rods.

Various modifications may be made in the device embodying my invention without departing from the spirit and scope thereof, and I desire that all such modifications clearly coming within the scope of the appended claims shall be considered to be covered thereby.

I claim as my invention:

1. An electric air heater comprising a casing, a plurality of substantially parallel rods supported in said casing, an electric resistance conductor wound around said rods, a plurality of insulating plates fastened to said rods and lying substantially perpendicular thereto, each plate separating an adjacent pair of convolutions of said wound conductor, each plate having one edge thereof recessed sufficiently between two of said rods to permit one span of the conductor to extend from one of said two rods through the recess to the other, whereby to permit two successive convolutions of the conductor to lie on opposite sides of the plate.

2. The combination of claim 1 wherein the recesses of the plates comprise notches aligned substantially parallel to said rods.

3. The combination of claim 1 wherein there are at least three of said rods.

4. An electric air heater comprising a casing, a plurality of substantially parallel rods, an electric resistance conductor wound around said rods and supported thereby, spacers of sheet metal mounted on said rods for separating the adjacent turns of said conductor, each spacer having thereon a coating of electric insulating material.

5. The combination of claim 4 wherein said spacers consist of perforated sheets strung on said rods and wherein each sheet is so strung on at least two of said rods.

6. The combination of claim 4 wherein said spacers comprise sheets folded at least once and wherein each such folded spacer has aligned perforations in two adjacent leaves threaded onto one rod.

CLARK M. OSTERHELD.

REFERENCES CITED

The following references are of record in the file of this patent:

UNITED STATES PATENTS

| Number | Name | Date |
|---|---|---|
| 1,602,804 | Wilkinson et al. | Oct. 12, 1926 |
| 1,712,010 | Somes | May 7, 1929 |
| 2,153,078 | Deuches | Apr. 4, 1939 |
| 2,228,101 | Willmann | Jan. 7, 1941 |
| 2,362,152 | Osterheld | Nov. 7, 1944 |